(12) United States Patent
Umemura (10) Patent No.: US 8,704,599 B2
(45) Date of Patent: Apr. 22, 2014

(54) SWITCHING POWER SUPPLY CIRCUIT

(71) Applicant: Canon Kabushiki Kaisha, Tokyo (JP)

(72) Inventor: Naoki Umemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/673,913

(22) Filed: Nov. 9, 2012

(65) Prior Publication Data

US 2013/0135902 A1    May 30, 2013

(30) Foreign Application Priority Data

Nov. 28, 2011   (JP) ................................ 2011-259508

(51) Int. Cl.
*H03F 3/04*    (2006.01)
(52) U.S. Cl.
USPC ............................................ 330/297; 330/10
(58) Field of Classification Search
USPC .................. 330/297, 10, 207 P, 298, 276, 165
See application file for complete search history.

(56) References Cited

U.S. PATENT DOCUMENTS

| 7,944,652 | B2 * | 5/2011 | Fukumoto ...................... 361/23 |
| 8,107,641 | B2 | 1/2012 | Sakata et al. |
| 8,138,731 | B2 * | 3/2012 | Chen .............................. 323/272 |
| 2007/0008744 | A1 | 1/2007 | Heo et al. |
| 2007/0176566 | A1 * | 8/2007 | Fukumoto ..................... 315/291 |
| 2013/0107585 | A1 * | 5/2013 | Sims et al. ................. 363/21.14 |
| 2013/0241463 | A1 * | 9/2013 | Bando et al. .................. 318/810 |

FOREIGN PATENT DOCUMENTS

| JP | 61-022760 U | 1/1986 |
| JP | 2007-020391 A | 1/2007 |

* cited by examiner

*Primary Examiner* — Henry Choe
(74) *Attorney, Agent, or Firm* — Fitzpatrick, Cella, Harper & Scinto (57) ABSTRACT

A highly power-efficient switching power supply is realized. A switching power supply circuit of the present invention comprises: a pulse generation unit configured to generate a pulse for alternately opening and closing a first and a second switching elements; and a switching unit configured to input a voltage to the pulse generation unit in accordance with the detected power consumption level in the external load, wherein the pulse generation unit is configured so as to reduce the pulse width of the pulse that is generated if the voltage input from the switching unit is higher than a reference voltage, and to increase the pulse width of the pulse that is generated if the voltage input from the switching unit is lower than the reference voltage.

6 Claims, 10 Drawing Sheets

SWITCHING POWER SUPPLY CIRCUIT

BACKGROUND OF THE INVENTION

1. Field of the Invention

The present invention relates to a switching power supply circuit.

2. Description of the Related Art

Figure 9:
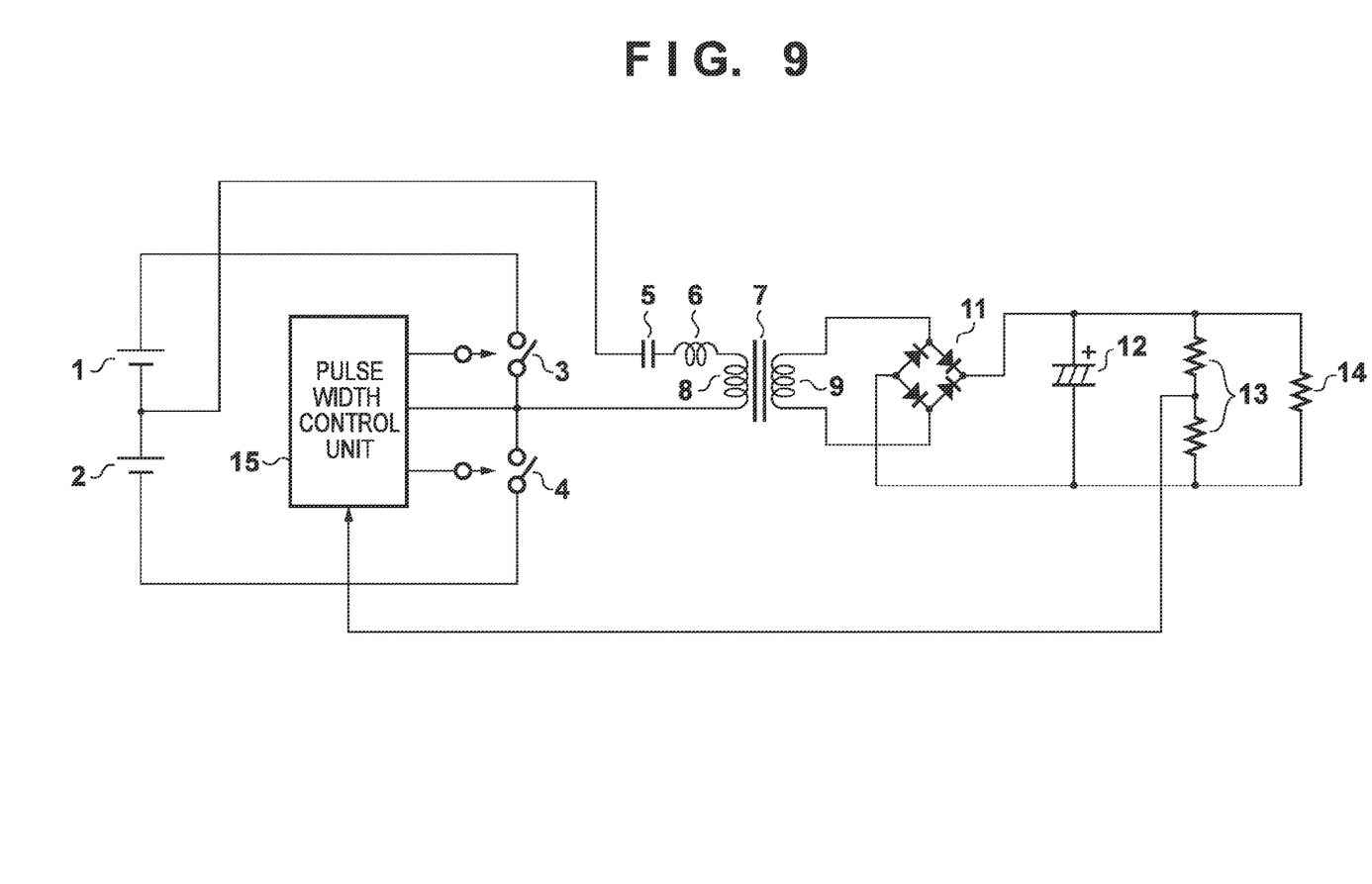
FIG. 9 is a circuit diagram of a conventional current resonance-type PWM power supply circuit.

One type of switching power supply is a pulse width modulation (PWM) controlled type in which the output voltage is adjusted by control of the pulse width (e.g., see Japanese Patent Laid-Open No. 61-22760 and Japanese Patent Laid-Open No. 2007-020391). There are also switching power supplies that have reduced noise and improvements in terms of loss through the use of current resonance. FIG. 9 is a typical circuit configuration diagram of a power supply circuit that uses current resonance in addition to pulse width control (referred to hereinafter as a current resonance-type PWM power supply). In FIG. 9, direct current (DC) power sources 1 and 2 are ordinarily configured so as to rectify and smooth a commercial alternating current (AC) power source. The DC power sources are connected to switching elements 3 and 4 that alternately switch ON/OFF so as to alternately allow positive and negative currents to flow to the primary coil of a transformer 7. A pulse width control unit 15 supplies a pulse signal for controlling the ON/OFF switching of the switching elements 3 and 4.

The pulse width control unit 15 is realized by a dedicated IC, for example, and has circuits for performing oscillation, reference voltage generation, error amplification, and pulse width control. The current that flows to the transformer 7 returns to the DC power sources 1 and 2 via an inductor 6 and a capacitor 5. The capacitance of the capacitor 5 is selected such that the series resonance frequency, which is determined by the combination with the inductor 6, is slightly higher than the pulse frequency. Here, the inductor 6 is an independent element or a leakage inductor of the primary coil of the transformer 7. The AC output of an amplified output coil 9, which is induced by the current flowing to the primary coil 8 of the transformer 7, is rectified and smoothed by a bridge diode 11 and a smoothing capacitor 12 so as to obtain a DC voltage. The DC output voltage is applied to an external load 14, which is the power supply destination. Note that the external load 14 in FIG. 9 equivalently represents the input impedance of an arbitrary load circuit (e.g., an amplifier).

Also, the DC output is connected to error detection resistors 13 that divide the voltage that is to be applied to the load, and send the divided voltage to the pulse width control unit 15. An error amplifier in the pulse width control unit amplifies errors between the divided voltage and a reference voltage, and the pulse width control circuit controls the pulse width that is output, based on the errors. Specifically, the pulse width control circuit operates so as to reduce the pulse width if the divided voltage is higher than the reference voltage, and increase the pulse width if the divided voltage is lower than the reference voltage. In this way, the DC voltage applied to the load resistor 14 is kept constant. Specifically, if the resistance value of the external load 14 has changed to a low value, the load current increases and the DC output voltage decreases, and therefore feedback is applied such that the pulse width increases (such that the voltage increases), and thus the output voltage is controlled so as to be constant.

Figure 10:
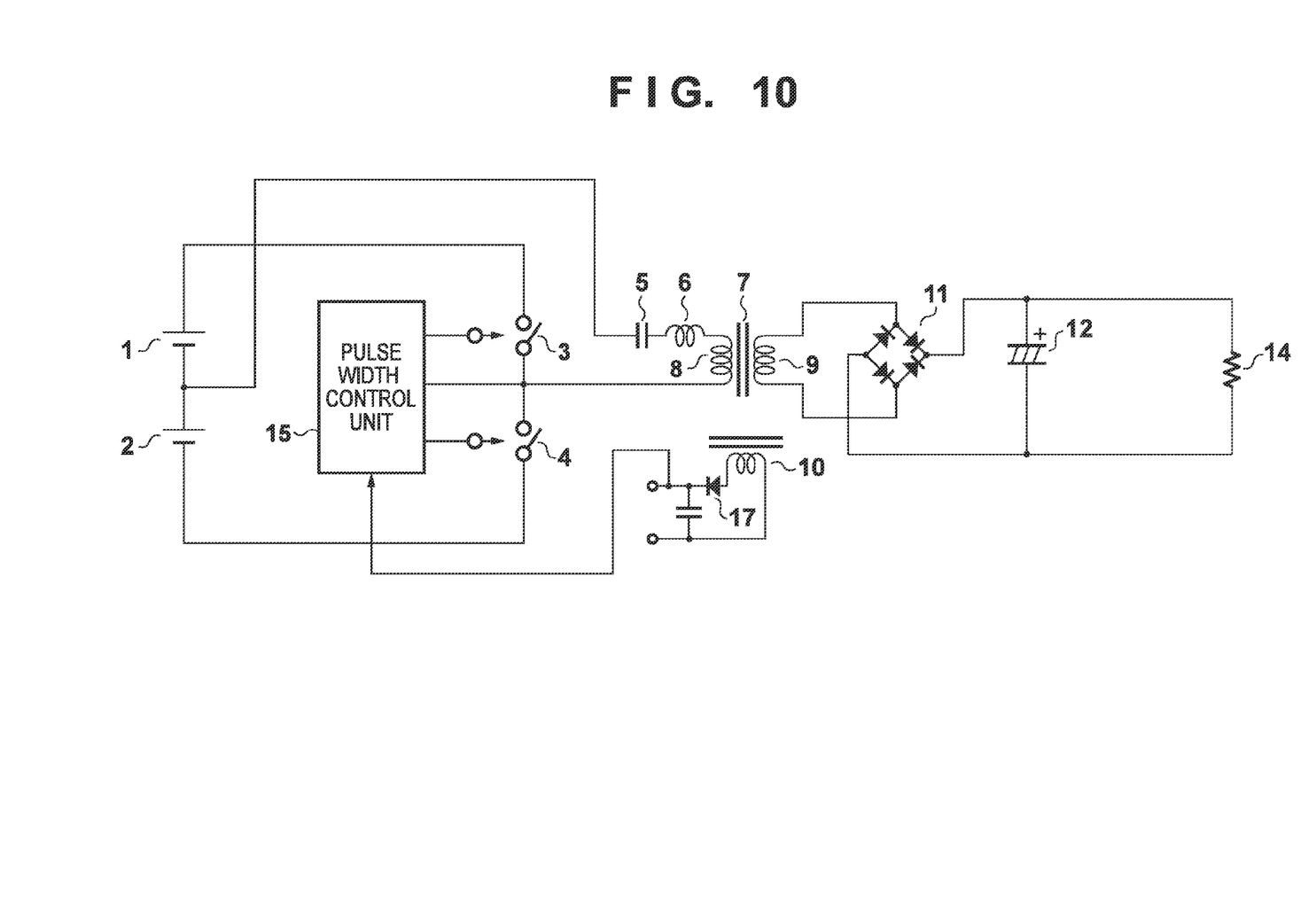
FIG. 10 is a circuit diagram of a current resonance-type PWM power supply circuit that is provided with a control coil.

When a high-output audio amplifier is envisioned as the external load to which power is supplied, a difference of 7.5 times, for example, exists between the DC voltage for amplified output (for the amplification operation) (e.g., 90 V) and the DC voltage for audio signal processing (e.g., 12 V). Therefore from the viewpoint of efficiency, a secondary amplified output coil 9 and a signal system coil (not shown) are provided as separate secondary coils, as shown in FIG. 10. Also, since the pulse width control unit 15 operates with a low voltage (e.g., 12 V), it is conceivable to similarly provide a control coil 10 for drawing a control DC voltage for the pulse width control unit 15. By inputting the AC output of the control coil 10 to the pulse width control unit 15 as the control DC voltage via a rectifying/smoothing circuit 17, it is possible to perform control such that the output voltage of the rectifying/smoothing circuit 17 is constant. Note that in order to prevent power supply switching noise from having a negative influence on the audio signal processing system in this case, it is envisioned that the control coil 10 is provided as a coil that is separate from the signal system coil (not shown).

However, in the circuit shown in FIG. 10, there is the possibility that the DC voltage for audio signal processing and the DC voltage in the amplified output stage are not controlled so as to be constant voltages. Specifically, if the audio input signal that is input to the amplifier is low, and the amplified output is low, the load impedance value will be a high value. For this reason, the sink current will be low, and the speed of response to voltage drops due to discharge in the smoothing capacitor 12 will be slow, thus resulting in the possibility of the problem that constant voltage control is not performed properly, and the voltage is relatively high.

Also, if the audio input signal that is input to the amplifier is high, and the amplified output is high, the influence of the leakage inductor will be relatively high due to a limit on the core size of the transformer (limit on number of turns). For example, the number of turns of the control coil is four, and the number of turns of the amplified output coil is 30. The control DC voltage that is subjected to constant voltage control is obtained by the rectification and smoothing of the AC voltage that appears in the leakage inductor and the inductor of the original coil portion, and the AC voltage of the original coil portion is relatively low. In other words, the voltage in the amplified output stage is relatively low since the AC voltage of the original coil portion is reflected in the AC voltage of the amplified output coil 9. The influence of this is remarkable particularly in the case of high output. Furthermore, in the case of high output, the current that flows to the resonance circuit is high, and changes in the pulse width are suppressed by the influence of the Q value of the resonance circuit. For this reason, it is also conceivable that precision will decrease in the constant voltage control performed on the control coil 10, and that the voltage in the amplified output stage will decrease. In other words, there is the possibility of the problem that rated output is not obtained in the case of a high load.

SUMMARY OF THE INVENTION

The present invention provides a switching power supply circuit that has high power efficiency and suppresses reductions in output in the case of high output.

According to one aspect of the present invention, a switching power supply circuit comprises: a first switching element and a second switching element that are connected in series to a direct current power source; a resonance circuit that includes an inductor and a capacitor; a transformer that has a primary coil, a first secondary coil, and a second secondary coil, the primary coil being connected to the resonance circuit and a connection point between the first switching element and the second switching element; an output terminal configured to rectify and smooth an induced voltage that is induced at the first secondary coil, and supply a resulting voltage to an external load; a pulse generation unit configured to generate a pulse for alternately opening and closing the first switching element and the second switching element to allow a resonance current to flow to the primary coil and the resonance circuit; a detection unit configured to detect whether a power consumption level in the external load connected to the output terminal is a predetermined power level or higher; and a switching unit configured to input a predetermined constant voltage to the pulse generation unit if the detection unit detected that the power consumption level in the external load is the predetermined power level or higher, and to input to the pulse generation unit a voltage obtained by an induced voltage that is induced at the second secondary coil being rectified and smoothed if the detection unit detected that the power consumption level in the external load is lower than the predetermined power level, wherein the pulse generation unit is configured so as to reduce the pulse width of the pulse that is generated if the voltage input from the switching unit is higher than a reference voltage, and to increase the pulse width of the pulse that is generated if the voltage input from the switching unit is lower than the reference voltage, and the predetermined constant voltage is set lower than the reference voltage.

The present invention enables providing a switching power supply circuit that has high power efficiency and suppresses reductions in output in the case of high output.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, preferred embodiments of the present invention will be described in detailed with reference to the drawings. Note that the following embodiments are merely examples, and are not intended to limit the scope of the present invention.

First Embodiment

The following describes a first embodiment of a power supply circuit according to the present invention, taking the example of a switching power supply circuit that is envisioned to output power to a high-output audio amplifier.

Circuit Configuration

Figure 1:
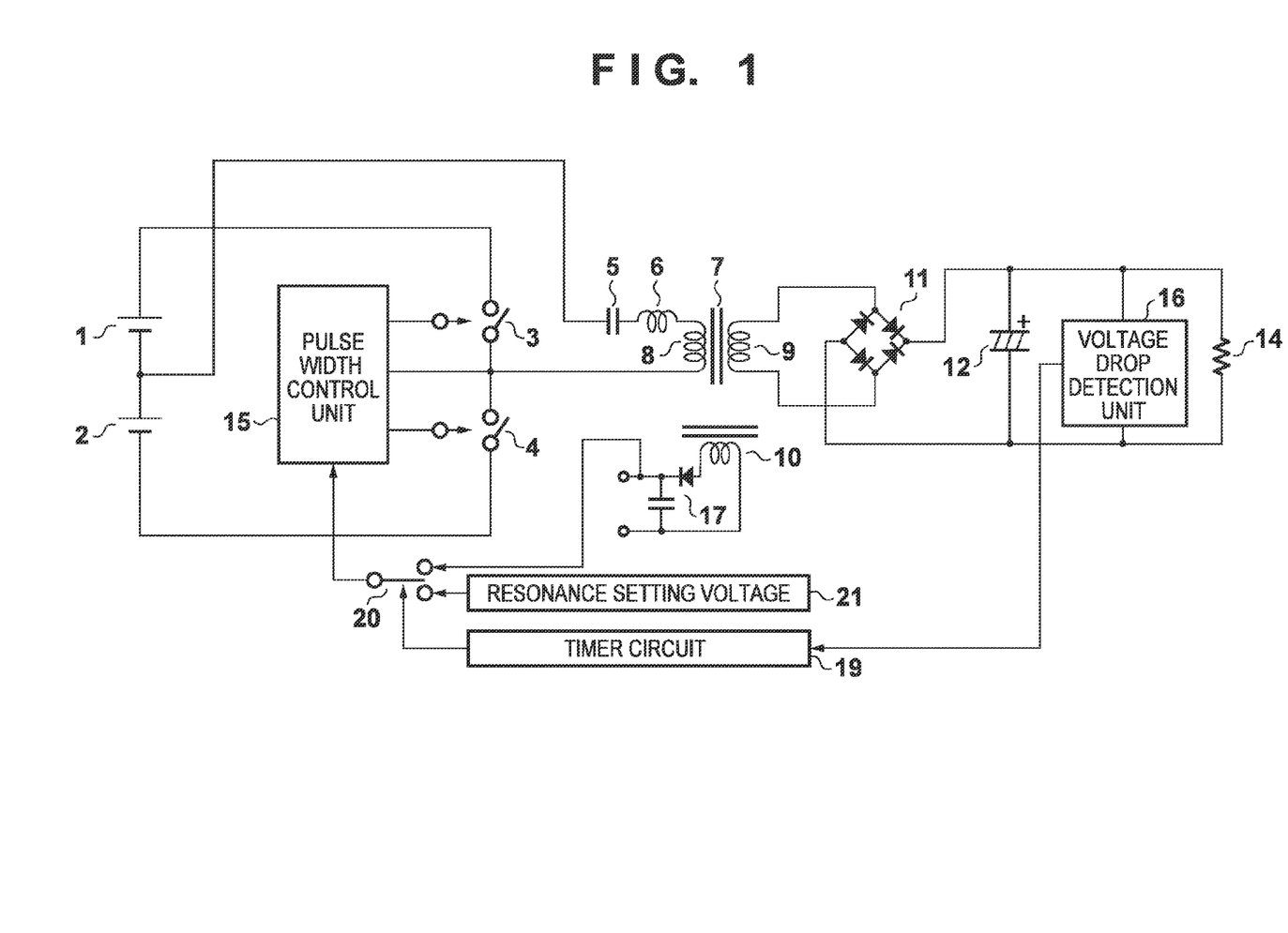
FIG. 1 is a circuit diagram of a power supply circuit according to a first embodiment.

FIG. 1 is a circuit diagram of a power supply circuit according to the first embodiment. Note that the same reference signs have been given to function units and elements that are the same as those in FIGS. 9 and 10 that show conventional power supply circuits.

In FIGS. 1, 1 and 2 denote DC power sources that, for example, rectify and smooth commercial AC power sources. The DC power sources are connected in serial to a switching element 3, which is the first switching element, and a switching element 4, which is the second switching element. The switching elements 3 and 4 alternately switch ON/OFF so as to alternately allow positive and negative currents to flow to a primary coil 8 of a transformer 7 that is connected to a connection point between the switching elements 3 and 4. A pulse width control unit 15 supplies a pulse signal for controlling the ON/OFF (open/close) switching of the switching elements 3 and 4. The pulse width control unit 15, which is a pulse generation unit, includes an oscillation function, a reference voltage, an error amplifier, and a pulse width control circuit.

The current that flows to the primary coil 8 of the transformer 7 returns to the DC power sources via an inductor 6 and a capacitor 5. The capacitance of the capacitor 5 is selected such that the resonance frequency of the resonance circuit that is configured by the inductor 6 and the capacitor 5 is slightly higher than the pulse frequency. Here, the inductor 6 may be realized by an independent element, or at least a portion thereof may be realized by a leakage inductor of the primary coil 8 of the transformer 7.

A bridge diode 11 and a smoothing capacitor 12 rectify and smooth AC output that is the induced voltage of a secondary amplified output coil 9 (first secondary coil), which is induced by the resonance current that flows to the primary coil 8 of the transformer 7, thus obtaining a DC output voltage. The DC output voltage is supplied to an external load 14 via an output terminal. The external load 14 equivalently represents the impedance of the amplified output stage. On the other hand, AC output that is induced at a secondary control coil 10 (second secondary coil) is rectified and smoothed by a rectifying/smoothing circuit 17 so as to obtain a control DC output voltage.

Also, a voltage drop detection unit 16 is connected in parallel to the external load 14, and the voltage drop detection unit 16 outputs a detection output signal if it has detected a decrease in the DC output voltage.

The detection output signal is sent to a timer circuit 19 that is configured by a retriggerable timer, for example, and is converted into pulses having a certain duration (e.g., 1 sec). A later-described change-over switch 20 performs switch control based on the pulses output from the timer circuit 19. Note that the timer circuit 19 is for preventing the change-over switch 20 from performing switching within a predetermined time period when the current flowing to the external load 14 has repeatedly increased/decreased during a short period of time.

The change-over switch 20 is a switch for switching the voltage that is to be compared with the reference voltage in the pulse width control unit 15. Specifically, the pulse width control unit 15 receives either the control DC output voltage generated from the AC output that is induced at the control coil 10, or the resonance setting voltage that is supplied from a resonance setting voltage generation unit 21. Note that the resonance setting voltage is set as a voltage that is sufficiently lower than the reference voltage in the pulse width control unit.

Circuit Operations

The change-over switch 20 performs switching such that the resonance setting voltage supplied from the resonance setting voltage generation unit 21 is input to the pulse width control unit 15 only while the pulse signal is being input from the timer circuit 19. In other words, while the current flowing to the external load 14 is low, and the detection output signal is not output from the voltage drop detection unit 16, the DC output voltage from the control coil 10 is input to the pulse width control unit 15.

An error amplifier in the pulse width control unit 15 is configured so as to amplify errors between the voltage that is input and the reference voltage, and control the pulse width control circuit. Specifically, the error amplifier performs control so as to reduce (shorten) the pulse width if the voltage input to the pulse width control unit 15 is higher than the reference voltage. On the other hand, the error amplifier performs control so as to increase (lengthen) the pulse width if the input voltage is lower than the reference voltage.

For this reason, while the load current flowing to the external load 14 is low, and the DC output voltage from the control coil 10 is input to the pulse width control unit 15, control is performed similarly to the current resonance-type PWM control described using FIG. 10. Here, this operation mode is referred to as the "pulse width control mode".

On the other hand, if the load current flowing to the external load 14 is high, the amplified output DC voltage from the amplified output coil 9 is reduced by the leakage inductor. The voltage drop detection unit 16 detects this voltage drop and outputs the detection output signal. In response to the detection output signal that was input, the timer circuit 19 generates pulses having a certain duration (e.g., 1 sec). Accordingly, the change-over switch 20 performs switching such that the resonance setting voltage supplied from the resonance setting voltage generation unit 21 is input to the pulse width control unit 15. Note that the resonance setting voltage is set in advance as a voltage that is sufficiently lower than the reference voltage in the pulse width control unit. In other words, the pulse width control circuit in the pulse width control unit 15 is controlled so as to output constant maximum width pulses while the resonance setting voltage is being input to the pulse width control unit 15. Here, this operation mode is referred to as the "current resonance mode".

In the current resonance mode, constant maximum width pulses are output from the pulse width control unit 15, resulting in a rise in the DC output voltage from the amplified output coil 9. In other words, based on the decrease in the DC output voltage, it is determined that the power consumption level of the external load 14 is a predetermined power level or higher. Due to operating in the current resonance mode in this mode, it is possible to resolve the problem that the output decreases in the case of high output in the conventional current resonance-type PWM power supply (FIG. 10). On the other hand, if a decrease in the DC output voltage is not detected, it is determined that the power consumption level in the external load 14 is lower than the predetermined power level, and operations are performed in the pulse width control mode.

Figure 8:
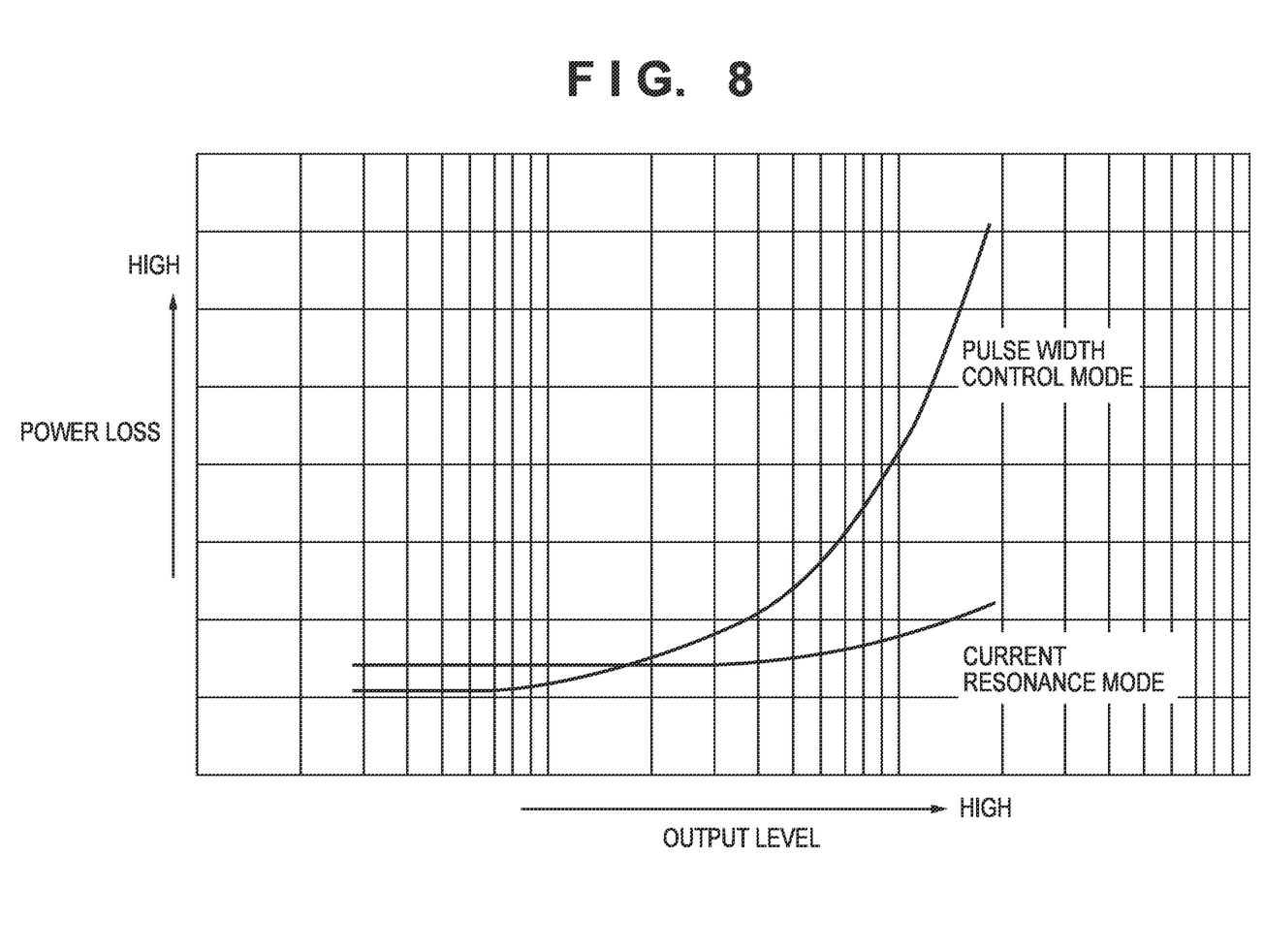
FIG. 8 is a diagram showing a comparison of loss in a pulse width control mode and a current resonance mode.

FIG. 8 is a diagram showing an example of a comparison of loss in the pulse width control mode and the current resonance mode. As can be understood from FIG. 8, in the case of high output, power loss is lower in the current resonance mode than in the pulse width control mode. On the other hand, in the case of low output, power loss is lower in the pulse width control mode than in the current resonance mode. Accordingly, it is understood that by operating in the pulse width control mode in the case of low output and operating in the current resonance mode in the case of high output, a switching power supply that is highly efficient over a wider amplified output range is realized.

Note that the condition (threshold value) for switching between the pulse width control mode and the current resonance mode can be set in advance as a voltage value (or voltage decrease amount) that is detected by the voltage drop detection unit 16. This voltage value needs only be determined based on the relationship between amplified output and power loss in the pulse width control mode and the current resonance mode, and example of which is shown in FIG. 8.

Note that although the voltage value for switching between these two modes does not need to match the voltage value at the cross point of power efficiency in the two modes, it is desirable that the following is taken into consideration.

If the two modes are switched at a voltage value that is lower than the voltage value at the cross point of the power efficiencies in the two modes, there is somewhat of an increase in power loss between the voltage value at which switching is performed and the voltage value at the cross point. However, there is the advantage that operations are smoother from low output to high output. On the other hand, if the two modes are switched at a voltage value that is higher than the voltage value at the cross point of the power efficiencies in the two modes, there is somewhat of an increase in power loss between the voltage value at the cross point and the voltage value at which switching is performed. However, in the case where, for example, the steady operation state is an output level that is higher than the cross point and lower than the mode switching point, there is the advantage that the occurrence of the mode switching operation can be suppressed. This makes it possible to anticipate more stable operation in the steady operation state. Note that the term "steady operation state" refers to the state in which, in the case where the external load is a speaker, for example, a volume level consecutively having that power level can be output continuously.

As described above, according to the power supply circuit of the first embodiment, in accordance with voltage drop detection in the power supply output stage, the power supply circuit normally operates in the pulse width control mode, and operates in the current resonance mode when a voltage drop is detected. This enables realizing a switching power supply that is highly efficient over a wider amplified output range.

Variation 1

Figure 2:
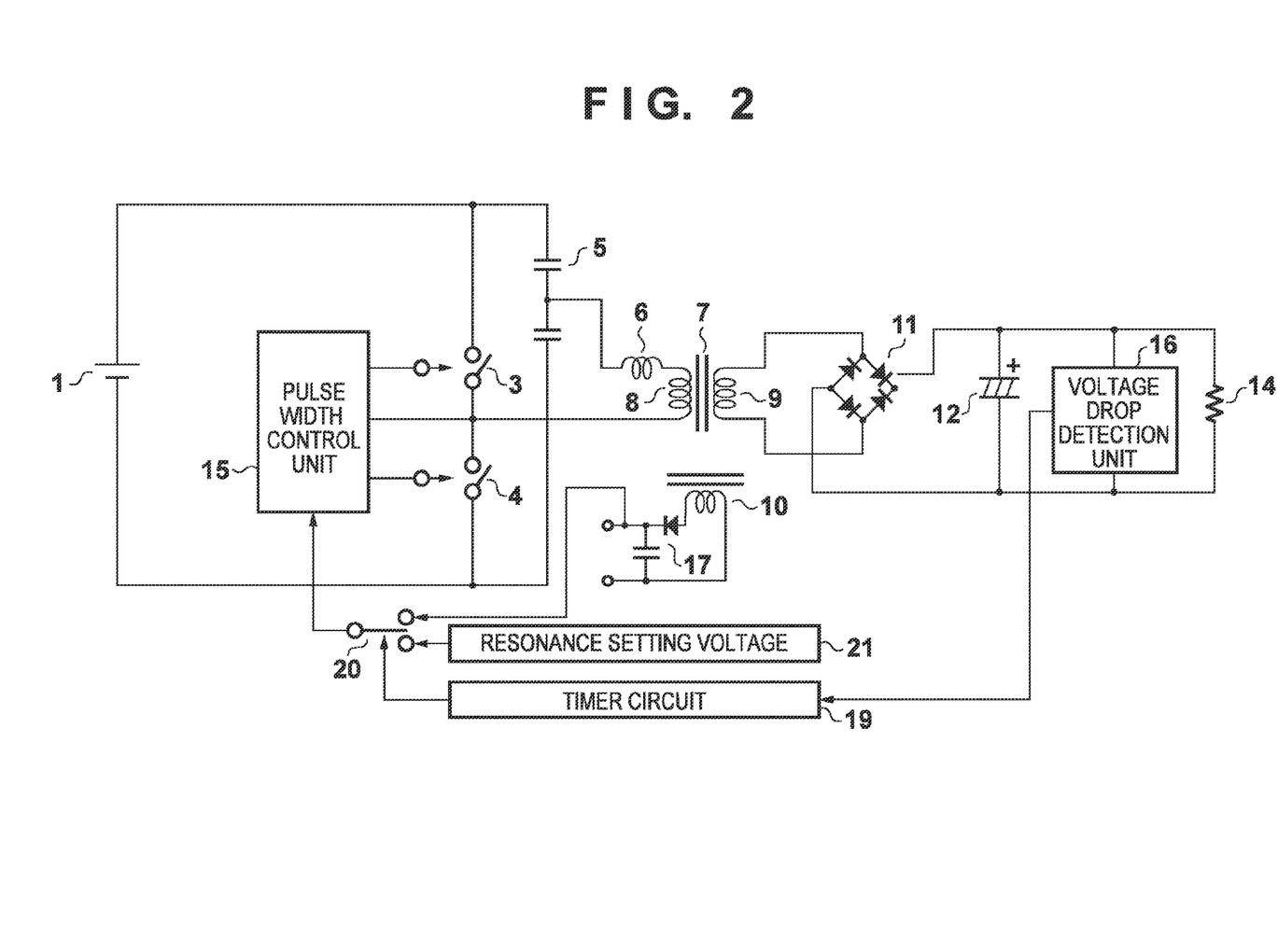
FIG. 2 is a circuit diagram of a power supply circuit according to Variation 1.

FIG. 2 is a circuit diagram of a power supply circuit according to Variation 1. Variation 1 differs from the first embodiment (FIG. 1) in that there is only one DC power source, namely the DC power source 1, and that the current resonance capacitor 5 is configured by two capacitors that have the same electrostatic capacitance. Note that the control operations in the power supply circuit of FIG. 2 will not be described since they are similar to the control operations that were described with reference to FIG. 1.

Variation 2

Figure 3:
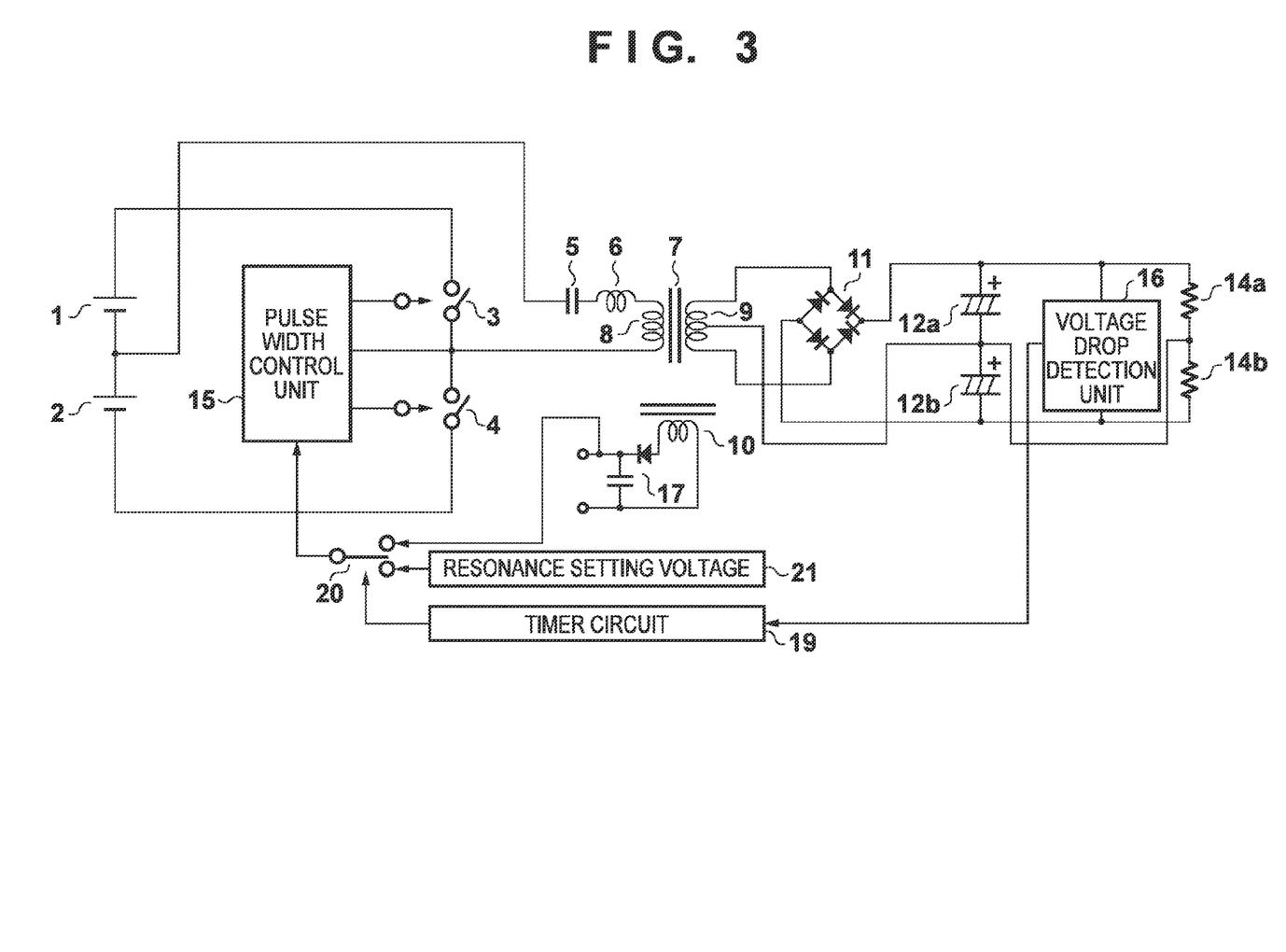
FIG. 3 is a circuit diagram of a power supply circuit according to Variation 2.

FIG. 3 is a circuit diagram of a power supply circuit according to Variation 2. Variation 2 differs from the first embodiment (FIG. 1) in that the amplified output coil 9 has a center tap, the secondary smoothing capacitor is configured by two smoothing capacitors 12a and 12b, and there are two power supply outputs. For this reason, external loads 14a and 14b corresponding to the two power supplies are connected as external loads. The control operations in the power supply circuit of FIG. 3 will not be described in detail since they are similar to the operations that were described with reference to FIG. 1.

Second Embodiment

The following describes a second embodiment of a power supply circuit according to the present invention, taking the example of a digital audio amplification apparatus.

Apparatus Configuration

Figure 4:
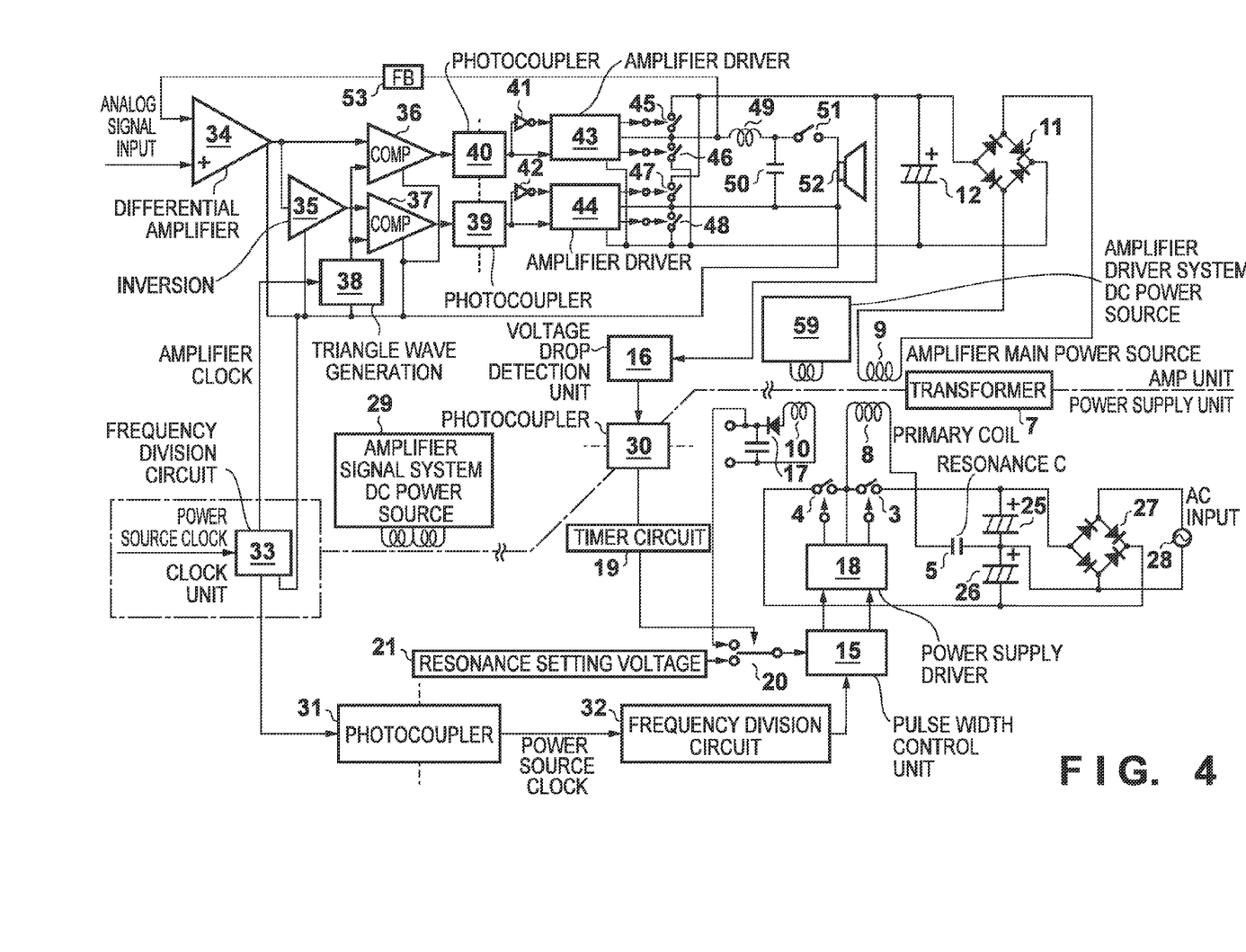
FIG. 4 is a circuit diagram of main portions of an audio amplification apparatus according to a second embodiment.

FIG. 4 is a circuit diagram of main portions of an audio amplification apparatus that includes an AMP unit that corresponds to the external load 14 in FIG. 1, a power supply unit that generates a DC power source from a commercial AC power source, and a clock unit that supplies a clock to these units. In particular, FIG. 4 shows the case where a floating power supply type of amplifier is used in the AMP unit. Note that the clock unit is used in common in order to reduce interference between clocks that occurs when the power supply unit and the AMP unit are connected.

Configuration of AMP Unit

With the floating power supply type of amplifier, when a sinusoidal wave signal is input to a differential amplifier 34, the difference between it and a feedback signal from a feedback circuit 53 is amplified. A comparator (COMP) 36 compares the output of the differential amplifier 34 and a triangle wave from a triangle wave generation circuit 38 that is synchronized with the amplifier clock. A comparator 37 compares the output of the differential amplifier 34, which has been converted to the opposite phase by an inversion amplifier 35, and the triangle wave from the triangle wave generation circuit 38 that is synchronized with the amplifier clock.

The pulse outputs from the comparators 36 and 37 are subjected to dielectric isolation by photocouplers 39 and 40, and then input to drivers 43 and 44. Here, the positive input terminals of the drivers 43 and 44 receive signals that have been inverted via inverters 41 and 42.

Output pulses from the drivers 43 and 44 are input to switching elements 45, 46, 47, and 48 so as to control the ON/OFF switching of these switching elements. When the switching elements 45 and 48 are switched ON, positive pulses of a single power source voltage are output to an inductor 49. On the other hand, when the switching elements 46 and 47 are switched ON, negative pulses of the single power source voltage are output to the inductor 49. These positive pulses and negative pulses are filtered by the inductor 49 and a capacitor 50, and amplified sinusoidal waves are output. The output sinusoidal waves drive a speaker 52 via a relay.

Also, 29 in FIG. 4 denotes an amplifier signal system DC power source, and 59 denotes an amplifier driver system DC power source. These DC power sources are constant voltage sources that are generated from the corresponding secondary coils of the transformer 7 of the power supply unit.

Configuration of Clock Unit

A frequency division circuit 33 generates an amplifier clock from a source clock that is input from the outside, and inputs the amplifier clock to the triangle wave generation circuit 38. Also, at the same time, the frequency division circuit 33 generates a power source clock from the source clock that is input from the outside, and supplies a predetermined clock to the pulse width control unit 15 via a photocoupler 31 and a frequency division circuit 32.

Configuration of Power Supply Unit

Since the configuration and operations are substantially the same as in the first embodiment described above, the following describes only the voltage drop detection unit 16. The detection output signal from the voltage drop detection unit 16 is subjected to dielectric isolation by a photocoupler 30, and thereafter is sent to the timer circuit 19. Dielectric isolation is performed such that noise in the power supply clock is prevented from going to the amplifier side via GND and the like.

Power Supply Unit Operations

While the input level that is input to the differential amplifier 34 of the AMP unit is lower than a predetermined input level, the current flowing to the speaker 52 is also within a predetermined range, and the DC voltage of the smoothing capacitor 12 is kept at a predetermined voltage. However, if the input level that is input to the differential amplifier 34 of the AMP unit increases, and the current flowing the speaker 52 increases, the DC voltage of the smoothing capacitor 12 decreases.

The voltage drop detection unit 16 outputs the detection output signal if it has detected a decrease in the DC voltage of the smoothing capacitor 12. The detection output signal is input to the timer circuit 19 via the photocoupler 30. In response to the detection output signal that was input, the timer circuit 19 generates pulses having a certain duration (e.g., 1 sec). Accordingly, the change-over switch 20 performs switching such that the resonance setting voltage supplied from the resonance setting voltage generation unit 21 is input to the pulse width control unit 15. In other words, if the current flowing to the speaker 52 increases, and the DC voltage of the smoothing capacitor 12 decreases, the operation of the power supply unit switches to the current resonance mode.

In the current resonance mode, constant maximum width pulses are output from the pulse width control unit 15, resulting in a rise in the DC output voltage from the amplified output coil 9. In other words, when a decrease in the DC output voltage is detected in the case of high output, the operation of the power supply unit switches to the current resonance mode, thus making it possible to resolve a decrease in the output of the speaker 52 that accompanies the decrease in output in the case of high output in the conventional current resonance-type PWM power supply (FIG. 10).

As described above, according to the audio amplification apparatus of the second embodiment, the power supply unit ordinarily operates in the pulse width control mode, and operates in the current resonance mode if a drop in the input voltage that is applied to the AMP unit is detected. This enables realizing an audio amplification apparatus that is highly efficient and stable over a wider output range.

Third Embodiment

The following describes a third embodiment of a power supply circuit according to the present invention, taking the example of another digital audio amplification apparatus.

Apparatus Configuration

Figure 5:
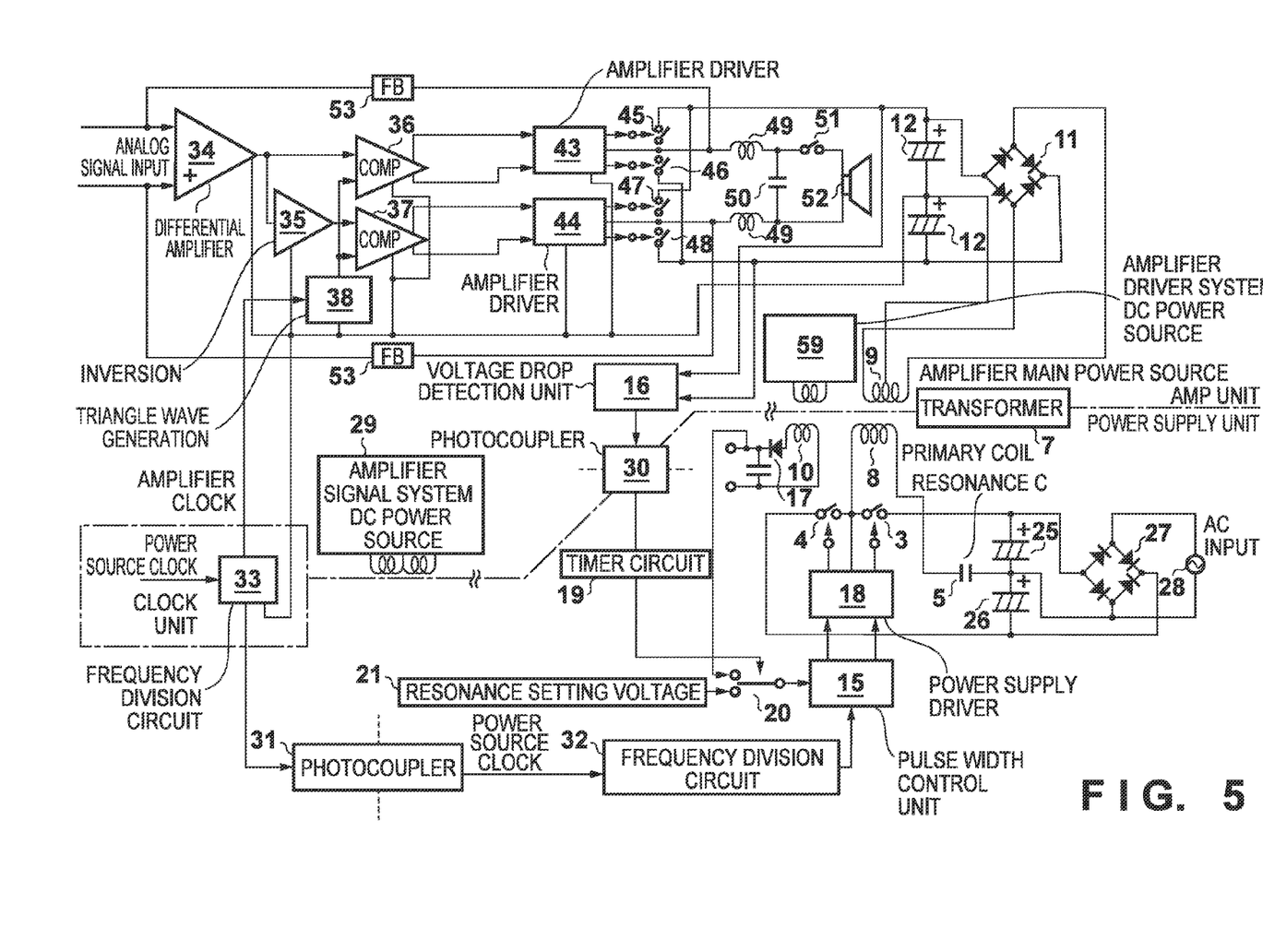
FIG. 5 is a circuit diagram of main portions of an audio amplification apparatus according to a third embodiment.

FIG. 5 is a circuit diagram of main portions of an audio amplification apparatus that includes an AMP unit that corresponds to the external load 14 in FIG. 1, a power supply unit that generates a DC power source from a commercial AC power source, and a clock unit that supplies a clock to these units. In particular, FIG. 5 shows the case where a full-bridge amplifier is used in the AMP unit. Note that the main differences from the second embodiment (FIG. 4) are that this full-bridge amplifier is used, and two power sources are generated. Also, the configurations of the clock unit and the power supply unit are similar to those in the second embodiment described above, and therefore will not be described here.

Configuration of AMP Unit

Although the full-bridge amplifier is different from the above-described floating power supply type of amplifier with respect to the following points, its operations will not be described in detail since they are substantially the same. Specifically, the full-bridge amplifier is different in that the comparators 36 and 37 have inverted outputs (inverters are not necessary for this reason), the photocouplers 39 and 40 are omitted, and the input stage GND and the output stage GND are the same. The full-bridge amplifier is also different in that two inductors 49 and the capacitor 50 are compatible with differential output, and there are two feedback (FB) circuits 53, which are compatible with differential output and differential input.

Power Supply Unit Operations

While the input level that is input to the differential amplifier 34 of the AMP unit is lower than a predetermined input level, the current flowing to the speaker 52 is also within a predetermined range, and the voltage between the two ends of the two smoothing capacitors 12 is kept at a predetermined voltage. However, if the input level that is input to the differential amplifier 34 of the AMP unit increases, and the current flowing the speaker 52 increases, the voltage between the two ends of the two smoothing capacitors 12 decreases.

The voltage drop detection unit 16 outputs the detection output signal if it has detected a decrease in the voltage between the two ends of the two smoothing capacitors 12. The detection output signal is input to the timer circuit 19 via the photocoupler 30. In response to the detection output signal that was input, the timer circuit 19 generates pulses having a certain duration (e.g., 1 sec). Accordingly, the change-over switch 20 performs switching such that the resonance setting voltage supplied from the resonance setting voltage generation unit 21 is input to the pulse width control unit 15. In other words, if the current flowing to the speaker 52 increases, and the voltage between the two ends of the two smoothing capacitors 12 decreases, the operation of the power supply unit switches to the current resonance mode.

As described above, according to the audio amplification apparatus of the third embodiment, even in the case where a full-bridge amplifier is used in the AMP unit, it is possible to realize an audio amplification apparatus that is highly efficient and stable over a wider output range.

Variation 3

In the embodiments described above, it is described that a voltage drop is detected in the voltage applied to the external load 14 (AMP unit), and the power supply unit operates in the current resonance mode if a drop is detected. However, another physical quantity may be detected and used for switching.

Figure 6:
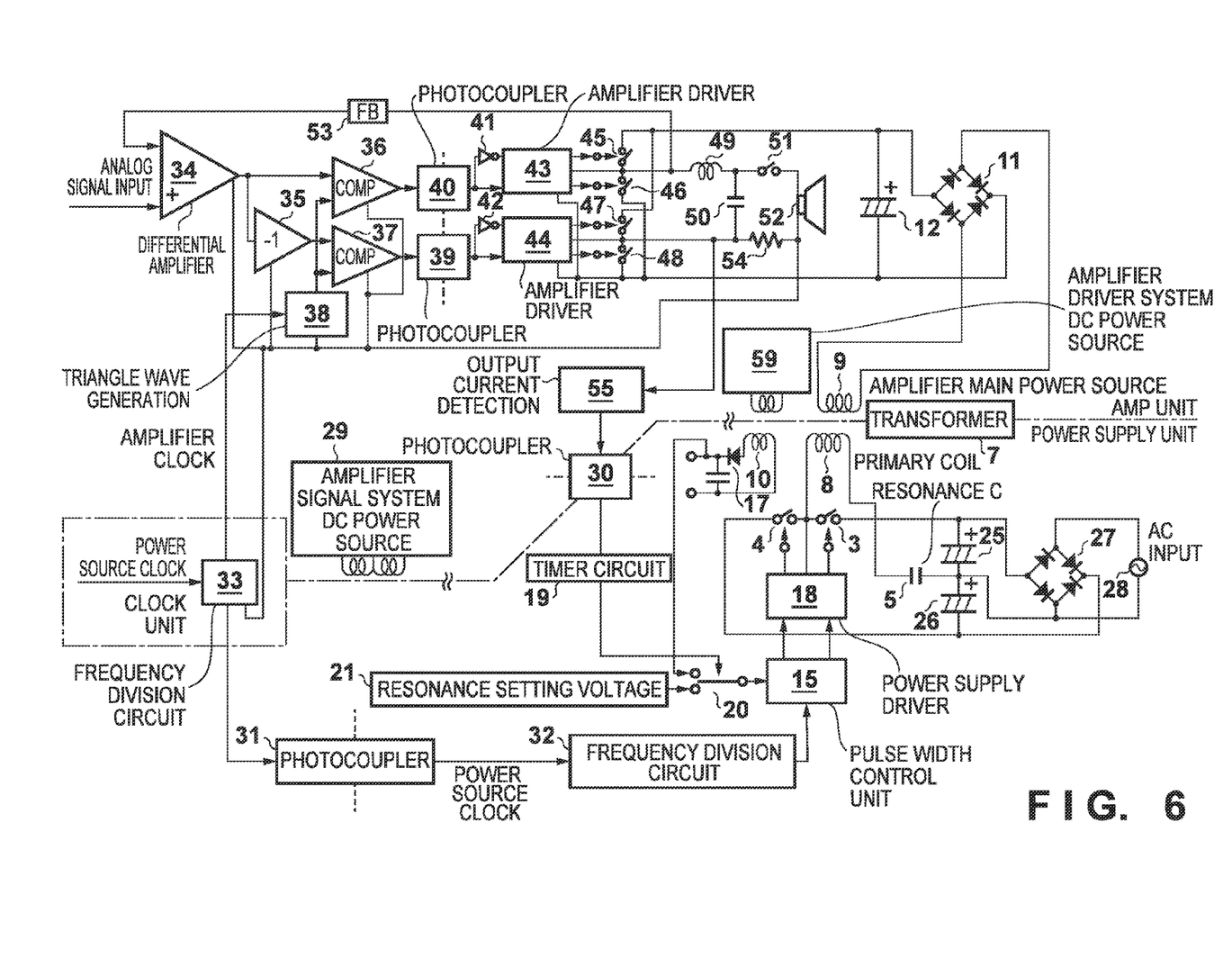
FIG. 6 is a circuit diagram of a power supply circuit that uses another detection unit.

FIG. 6 is a diagram showing an example in which a current detection resistor 54 is used in place of the voltage drop detection unit 16. In other words, the load current flowing to the speaker 52 is detected in this case. An output current detection unit 55 outputs a detection output signal if it has detected that the current flowing to the current detection resistor 54 is at a predetermined level or higher. The detection output signal is input to the timer circuit 19 via the photocoupler 30. In response to the detection output signal that was input, the timer circuit 19 generates pulses having a certain duration (e.g., 1 sec). Accordingly, the change-over switch 20 performs switching such that the resonance setting voltage supplied from the resonance setting voltage generation unit 21 is input to the pulse width control unit 15.

Figure 7:
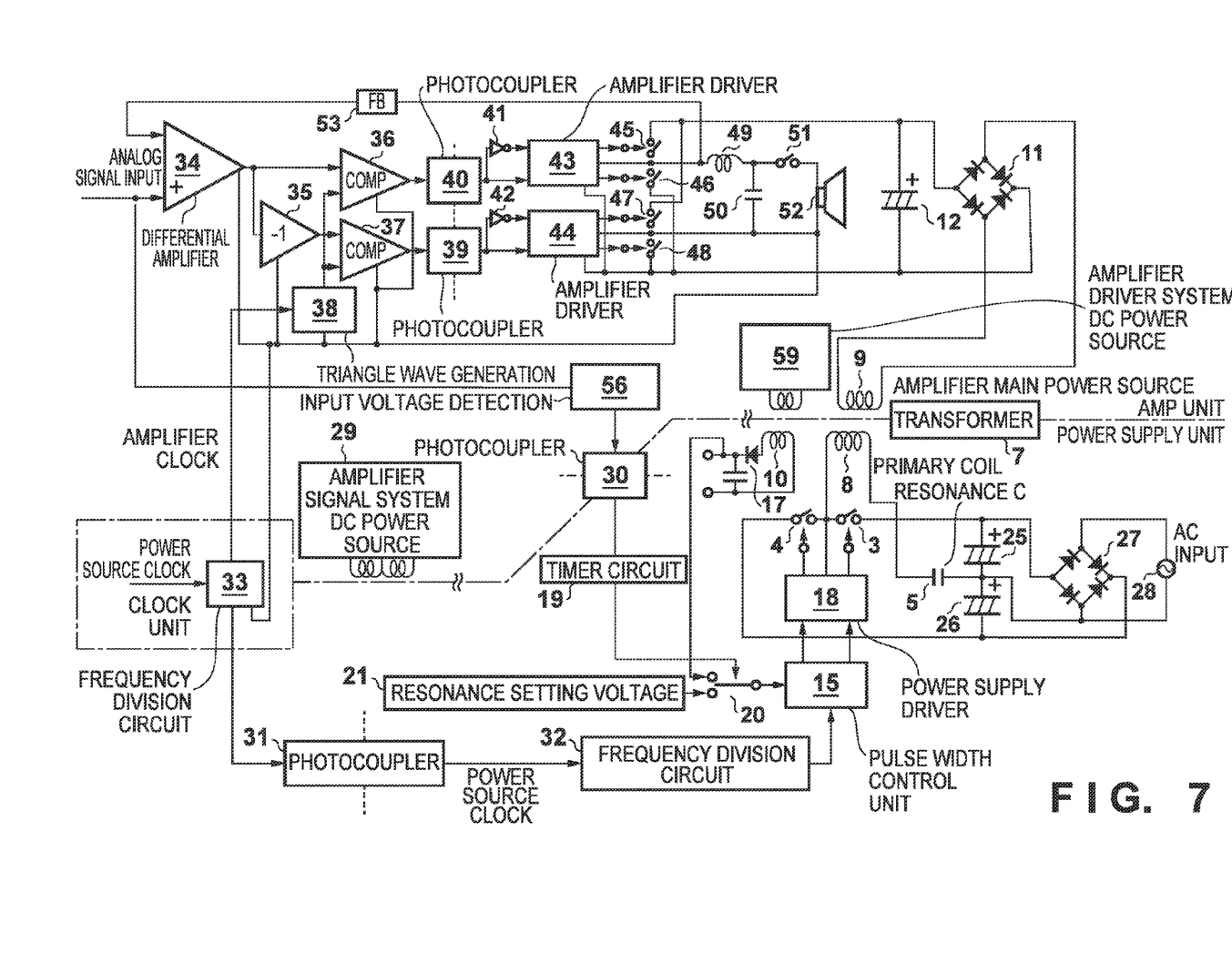
FIG. 7 is a circuit diagram of a power supply circuit that uses yet another detection unit.

FIG. 7 is a diagram showing an example in which an input voltage detection unit 56, which detects the voltage level of an input signal (audio signal) that is input to the AMP unit, is used in place of the voltage drop detection unit 16. Specifically, the input voltage detection unit 56 outputs a detection output signal if it detects that the voltage level of the input signal that is input to the AMP unit is a predetermined level or higher. The detection output signal is input to the timer circuit 19 via the photocoupler 30. In response to the detection output signal that was input, the timer circuit 19 generates pulses having a certain duration (e.g., 1 sec). Accordingly, the change-over switch 20 performs switching such that the resonance setting voltage supplied from the resonance setting voltage generation unit 21 is input to the pulse width control unit 15.

In this way, the level of power consumed by the external load 14 (AMP unit) can be detected with various physical quantities. For this reason, a highly efficient audio amplification apparatus can be realized by causing the power supply unit to operate in the current resonance mode if it has been determined that the power consumption level is at a predetermined power level or higher based on the detected physical quantity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-259508, filed Nov. 28, 2011, which is hereby incorporated by reference herein in its entirety.

What is claimed is:

1. A switching power supply circuit comprising:
   a first switching element and a second switching element that are connected in series to a direct current power source;
   a resonance circuit that includes an inductor and a capacitor;
   a transformer that has a primary coil, a first secondary coil, and a second secondary coil, the primary coil being connected to the resonance circuit and a connection point between the first switching element and the second switching element;
   an output terminal configured to rectify and smooth an induced voltage that is induced at the first secondary coil, and supply a resulting voltage to an external load;
   a pulse generation unit configured to generate a pulse for alternately opening and closing the first switching element and the second switching element to allow a resonance current to flow to the primary coil and the resonance circuit;
   a detection unit configured to detect whether a power consumption level in the external load connected to the output terminal is a predetermined power level or higher; and
   a switching unit configured to input a predetermined constant voltage to the pulse generation unit if the detection unit detected that the power consumption level in the external load is the predetermined power level or higher, and to input to the pulse generation unit a voltage obtained by an induced voltage that is induced at the second secondary coil being rectified and smoothed if the detection unit detected that the power consumption level in the external load is lower than the predetermined power level, wherein the pulse generation unit is configured so as to reduce the pulse width of the pulse that is generated if the voltage input from the switching unit is higher than a reference voltage, and to increase the pulse width of the pulse that is generated if the voltage input from the switching unit is lower than the reference voltage, and the predetermined constant voltage is set lower than the reference voltage.

2. The switching power supply circuit according to claim 1, wherein the detection unit detects whether the power consumption level in the external load is the predetermined power level or higher based on at least one of a voltage applied to the external load and a current flowing to the external load.

3. The switching power supply circuit according to claim 1, wherein at least a portion of the inductor is a leakage inductor of the primary coil.

4. The switching power supply circuit according to claim 1, wherein the switching unit includes a timer circuit configured to prevent switching of the voltage input to the pulse generation unit within a predetermined time period.

5. The switching power supply circuit according to claim 1, wherein the external load is a digital audio amplifier.

6. The switching power supply circuit according to claim 5, wherein the detection unit detects whether the power consumption level in the external load is the predetermined power level or higher based on an input level of an audio signal that is input to the digital audio amplifier.

* * * * *